(12) United States Patent
Chan

(10) Patent No.: US 11,050,311 B2
(45) Date of Patent: Jun. 29, 2021

(54) DRIVE APPARATUS FOR SEWING MACHINES

(71) Applicant: H. S. MACHINERY CO., LTD., New Taipei (TW)

(72) Inventor: Tzu Sang Chan, New Taipei (TW)

(73) Assignee: H. S. MACHINERY CO., LTD., New Taipei (TW)

( * ) Notice: Subject to any disclaimer, the term of this patent is extended or adjusted under 35 U.S.C. 154(b) by 212 days.

(21) Appl. No.: 16/142,489

(22) Filed: Sep. 26, 2018

(65) Prior Publication Data

US 2019/0229570 A1    Jul. 25, 2019

(30) Foreign Application Priority Data

Jan. 25, 2018    (TW) ................................. 107102727

(51) Int. Cl.
| | |
|---|---|
| *H02K 1/30* | (2006.01) |
| *H02K 5/20* | (2006.01) |
| *H02K 9/06* | (2006.01) |
| *D05B 71/00* | (2006.01) |
| *D05B 69/12* | (2006.01) |
| *D05B 69/30* | (2006.01) |

(Continued)

(52) U.S. Cl.
CPC ............... *H02K 1/30* (2013.01); *D05B 69/12* (2013.01); *D05B 69/30* (2013.01); *D05B 71/00* (2013.01); *H02K 5/20* (2013.01); *H02K 7/085* (2013.01); *H02K 7/088* (2013.01); *H02K 9/06* (2013.01); *H02K 11/215* (2016.01); *H02K 7/14* (2013.01); *H02K 15/16* (2013.01); *H02K 2201/03* (2013.01)

(58) Field of Classification Search
CPC .............................. H02K 1/30; H02K 11/215
See application file for complete search history.

(56) References Cited

U.S. PATENT DOCUMENTS 2,149,873 A * 3/1939 Shapiro ................ D05B 69/125
                                                  192/17 R
3,224,543 A * 12/1965 Hedegaard ............. D05B 69/22
                                                 192/145

(Continued)

FOREIGN PATENT DOCUMENTS

| CN | 101359852 | 2/2009 |
|---|---|---|
| CN | 101736539 | 6/2010 |

(Continued)

OTHER PUBLICATIONS

Chinese Office Action issued in Application No. 201810083031.6, dated Oct. 10, 2020 (3 pages).

(Continued)

*Primary Examiner* — Alexander Talpalatski
(74) *Attorney, Agent, or Firm* — Ware, Fressola, Maguire & Barber LLP

(57) ABSTRACT

A drive apparatus for sewing machines including a forepart and a motor shaft horizontally projecting out of the forepart is provided with a sleeve releasably secured to the motor shaft; a rotor disposed on the sleeve; and a motor assembly including a housing having an axial passage with the sleeve rotatably disposed through, an inner space disposed on an end of the housing proximate the forepart, and a stator set disposed in the inner space. The rotor is disposed in the inner space. The rotor, the sleeve, and the motor shaft are co-rotated.

18 Claims, 12 Drawing Sheets

(51) Int. Cl.
*H02K 11/215* (2016.01)
*H02K 7/08* (2006.01)
*H02K 15/16* (2006.01)
*H02K 7/14* (2006.01)

(56) References Cited

U.S. PATENT DOCUMENTS

| | | | | |
|---|---|---|---|---|
| 4,429,773 | A | * 2/1984 | Dohi | H02K 7/1125 |
| | | | | 192/18 B |
| 4,961,016 | A | * 10/1990 | Peng | H02K 9/06 |
| | | | | 310/59 |
| 7,007,618 | B1 | * 3/2006 | Chiu | D05B 69/125 |
| | | | | 112/275 |
| 2005/0035673 | A1 | * 2/2005 | Lafontaine | H02K 21/22 |
| | | | | 310/58 |
| 2015/0340925 | A1 | * 11/2015 | Kang | H02K 1/2786 |
| | | | | 310/71 |

FOREIGN PATENT DOCUMENTS

| | | |
|---|---|---|
| CN | 201860197 | 6/2011 |
| CN | 201933294 | 8/2011 |
| CN | 103132257 | 6/2013 |
| CN | 203883649 | 10/2014 |
| CN | 205356049 | 6/2016 |
| CN | 105790462 | 7/2016 |
| CN | 105839309 | 8/2016 |
| TW | M491685 | 12/2014 |
| TW | M569770 | 11/2018 |

OTHER PUBLICATIONS

Taiwan Patent Gazette issued in Application No. 107102727, dated Aug. 11, 2020 (11 pages).

* cited by examiner

DRIVE APPARATUS FOR SEWING MACHINES

CROSS REFERENCE TO RELATED PATENT APPLICATION

This application claims priority to Taiwan Patent Application No. 107102727, filed Jan. 25, 2018, the content of which is hereby incorporated by reference in its entirety.

TECHNICAL FIELD

The present invention relates to sewing machines and more particularly to a drive apparatus for sewing machines.

BACKGROUND OF THE INVENTION

A reliable drive apparatus is essential for quality operation of a sewing machine. The drive apparatus includes a driving mechanism and a position sensor. The driving mechanism may comprise an electric motor with a housing, a stator, a rotor, a cover, a bearing and an encoder. An important issue to be addressed is how to correctly assemble a motor shaft of the motor and a sleeve in a forepart of the sewing machine. Conventionally, front and rear bearings are used to rotatably support the motor shaft, which is in turn connected to the sleeve by means of a coupler or the like. However, such an assembly is complicated, time consuming and difficult to make. Further, the maintenance costs are high.

Thus, improvement is needed

SUMMARY OF THE INVENTION

The invention provides a drive apparatus for a sewing machine comprise a sleeve secured to an extension shaft of the sewing machine, and having an annular flange; a rotor disposed on the sleeve, and positioned against the flange; and a housing defining an inner space and a passage through which a free end of the sleeve extends; wherein a stator set is disposed in the inner space for cooperation with the rotor, and the rotor, sleeve and extension shaft are co-rotated.

Thus, the first aspect of the present invention is a drive apparatus for use in a sewing machine, comprising:

a sleeve secured to an extension shaft of the sewing machine, the sleeve having a free end and an annular flange adjacent to the free end;

a stator set;

a rotor disposed on the sleeve and positioned against the flange; and a housing having an inner space and a passage through which the free end of the sleeve extends, wherein the stator set is disposed in the inner space of the housing for cooperation with the rotor, and wherein the rotor, the sleeve and the extension shaft are co-rotatable.

According to an embodiment of the present invention, the drive apparatus further comprises an annular support disposed in the inner space of the housing and configured to position the stator set, wherein the sleeve is arranged to extend through the annular support and the passage.

According to an embodiment of the present invention, the drive apparatus further comprises a sensor secured to the stator set, the sensor is configured to provide signals indicating a position of the rotor relative to the stator set.

According to an embodiment of the present invention, the stator set is positioned to surround the rotor.

According to an embodiment of the present invention, the drive apparatus further comprises a first fan and a guide member fastened to the housing, the guide member having an opening in communication with the inner space of the housing, wherein the first fan is disposed between the opening of the guide member and the sleeve.

According to an embodiment of the present invention, the guide member is a plate member.

According to an embodiment of the present invention, the drive apparatus further comprises a guide member fastened to one side of the housing, and a first fan at least partially disposed in a space defined by the guide member.

According to an embodiment of the present invention, the guide member comprises a plurality of inlets and an outlet in communication with said space, for providing a passageway for air produced by the first fan.

According to an embodiment of the present invention, the drive apparatus further comprises a wheel secured to the sleeve at said free end, the wheel arranged for manual rotation of the extension shaft.

According to an embodiment of the present invention, the drive apparatus further comprises a second fan connected to the sleeve for rotation.

According to an embodiment of the present invention, the drive apparatus further comprises a second fan secured to the wheel.

According to an embodiment of the present invention, the drive apparatus further comprises a hood fastened to the housing to cover the second fan.

According to an embodiment of the present invention, the hood includes a releasable sleeve end cover arranged to cover the free end of the sleeve.

According to an embodiment of the present invention, the hood comprises a hood opening adjacent to the free end of the sleeve, said drive apparatus further comprising a cylindrical adapter connected to the sleeve partly through the hood opening, the cylindrical adapter arranged to mount an attachment member to the sleeve.

According to an embodiment of the present invention, the sensor is secured to the stator set for detecting rotation of magnetic poles of the rotor.

The second aspect of the present invention is a method for use with a sewing machine, the sewing machine having an extension shaft, the method comprising:

securing a sleeve secured to the extension shaft of the sewing machine, the sleeve having a free end and an annular flange adjacent to the free end;

securing a rotor on the sleeve and positioned against the flange such that the rotor, the sleeve and the extension shaft are co-rotatable;

providing a housing over the sleeve the housing having an inner space and a passage through which the free end of the sleeve extends;

providing a stator set in the inner space of the housing for cooperation with the rotor; and securing a sensor to the stator set for detecting a position of the rotor relative to the stator set while the extension shaft of the sewing machine is rotating.

According to an embodiment of the present invention, the method further comprises securing a guide member to the housing, the guide member having an opening; and providing a first fan between the opening of the guide member and the sleeve for cooling purposes.

According to an embodiment of the present invention, the method further comprises a guiding member comprises a plurality of inlets and an outlet in communication with said space, for providing a passageway for air produced by the first fan.

According to an embodiment of the present invention, the method further comprises securing a wheel on the free end of the sleeve, the wheel arranged for manual rotation of the extension shaft; and securing a second fan to the free end in relationship to the wheel for cooling purposes.

According to the method of the present invention, the stator set is positioned to surround the rotor.

DETAILED DESCRIPTION OF THE INVENTION

Referring to FIGS. 1 to 6, a drive apparatus 100 for a sewing machine is shown mounted to a body part of a sewing machine. The body part may be a forepart A1 of the sewing machine. The forepart A1 may include a cavity A12 that is open at its lowermost side (or at the bottom, or base, of the forepart A1) and an extension shaft A11 projecting from the cavity A12.

Figure 1:
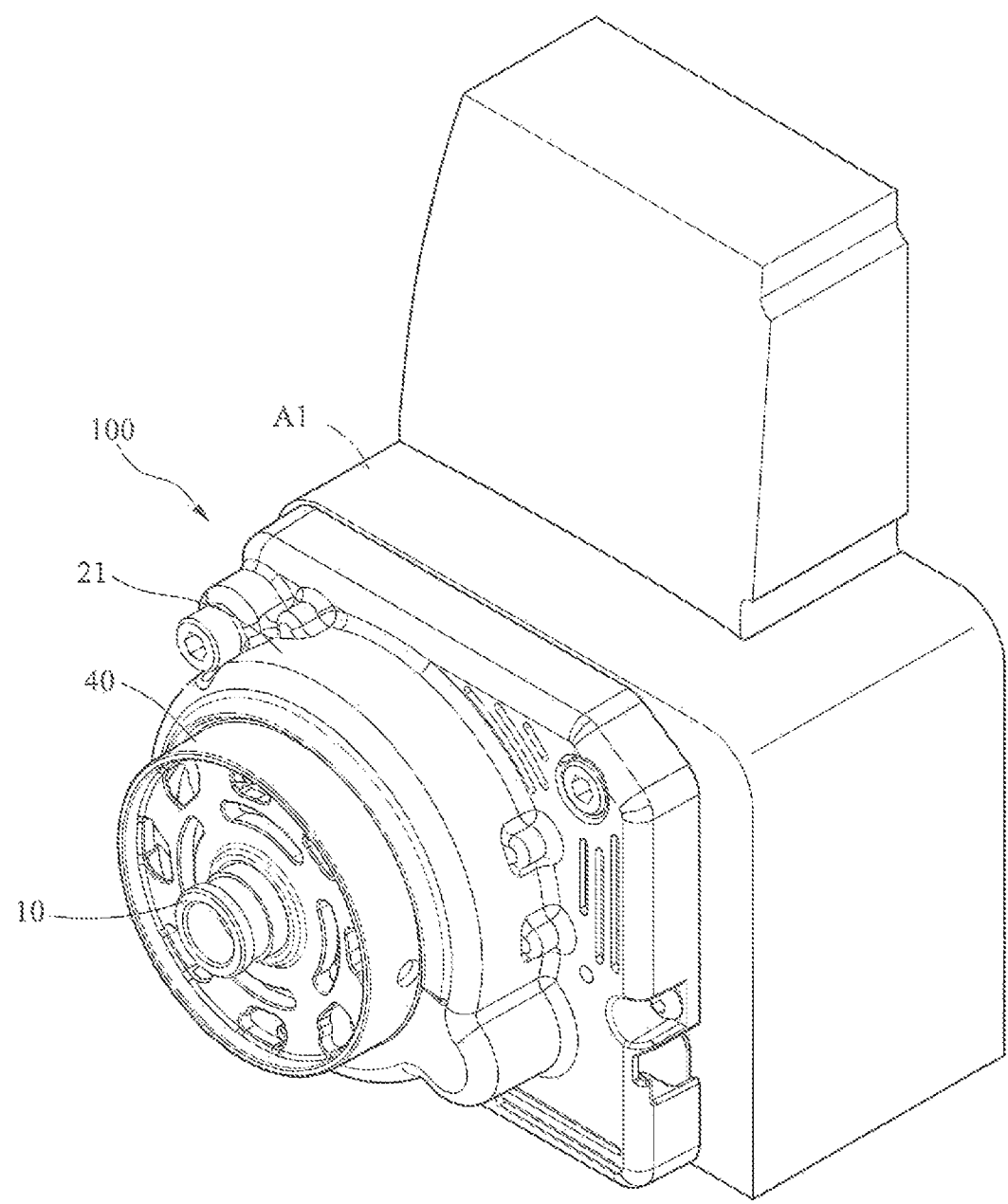
FIG. 1 is a perspective view of a drive apparatus for a sewing machine according to an embodiment of the present invention.
Figure 2:
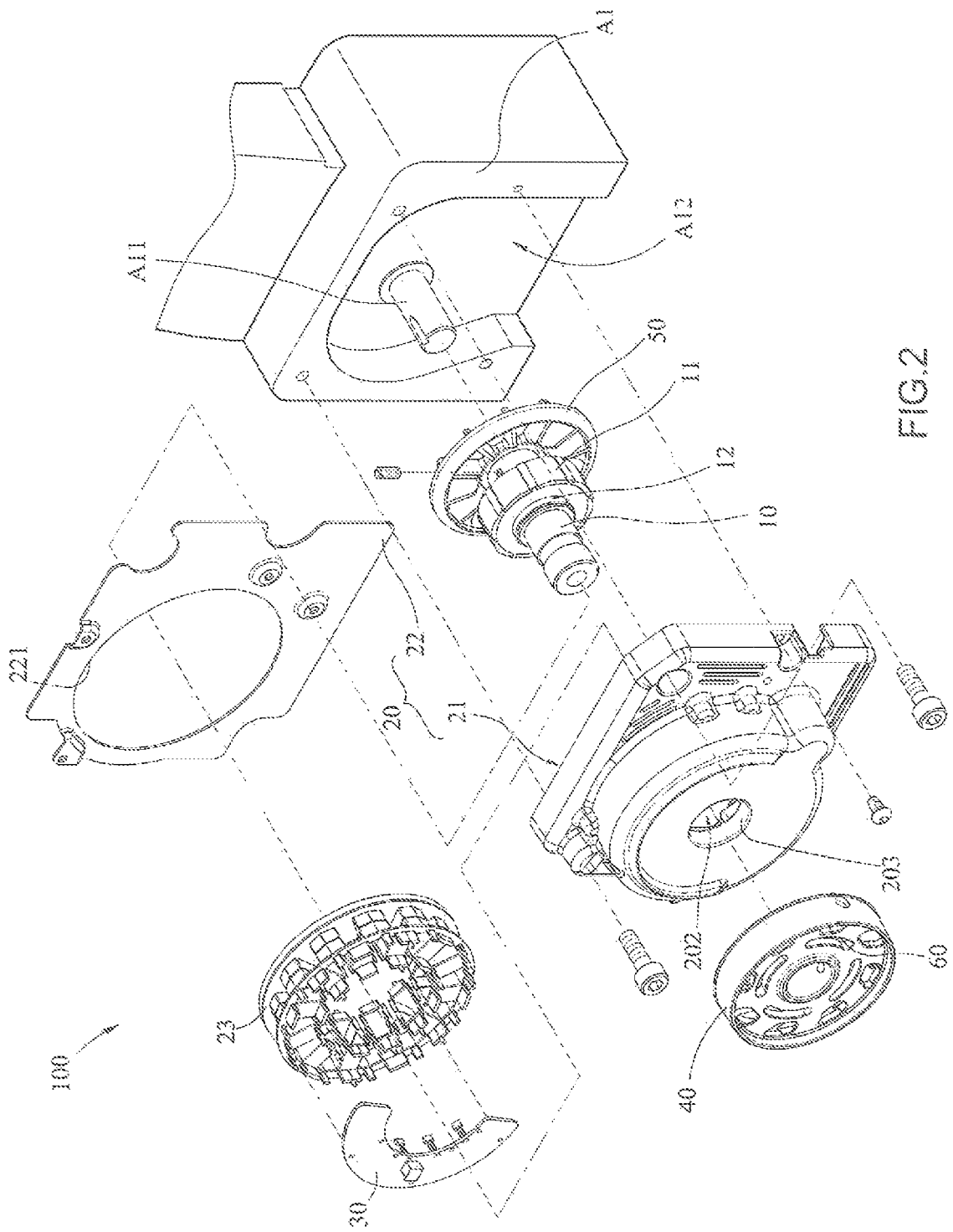
FIG. 2 is an exploded view of FIG. 1.
Figure 3:
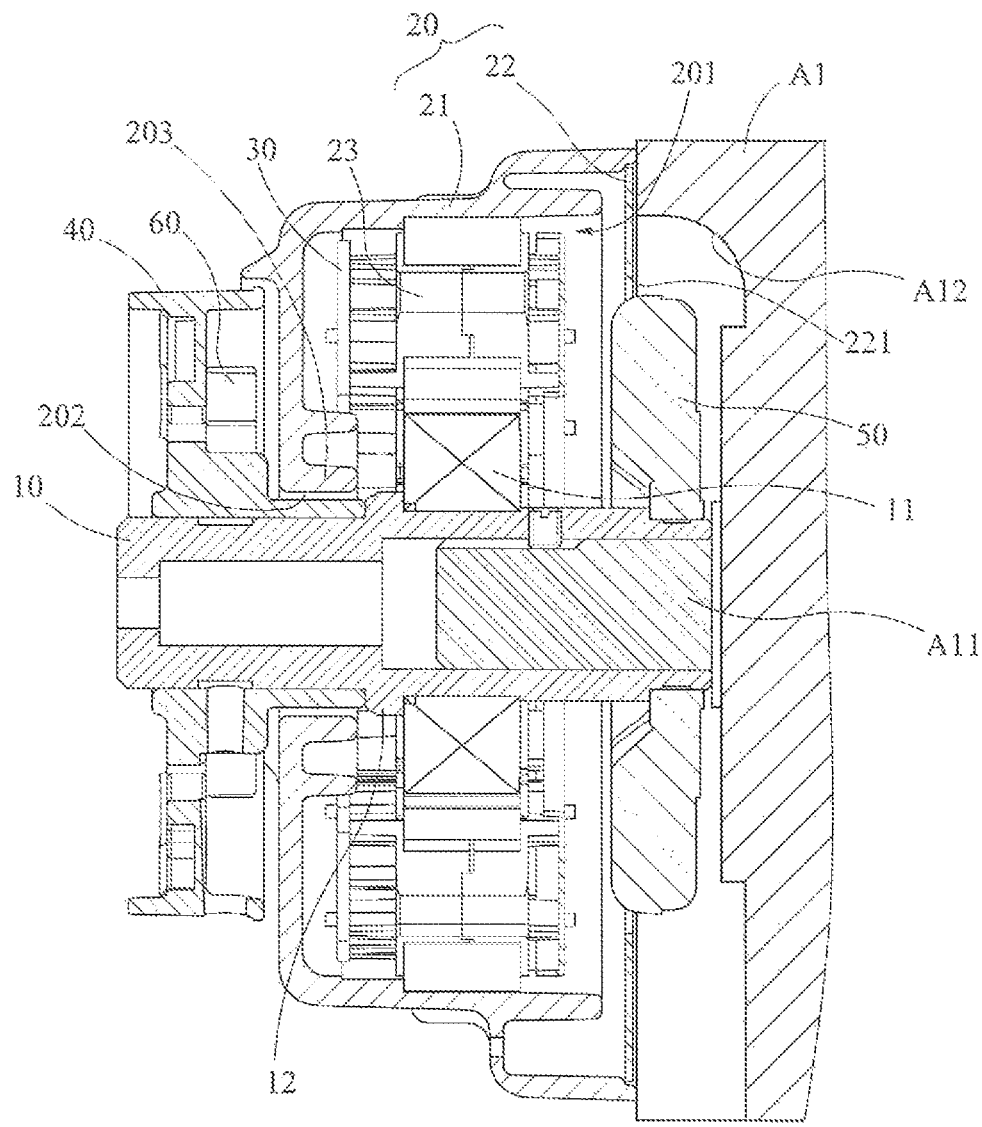
FIG. 3 is a longitudinal sectional view of the drive apparatus of FIG. 1.

As seen in FIGS. 2 and 3, the drive apparatus 100 comprises a sleeve 10 secured to the extension shaft A11 so as to be rotatable with the extension shaft A11. The drive apparatus 100 also comprises an annular flange 12 and a rotor 11 both provided on the sleeve 10. The rotor 11 is positioned by abutting, or pressing, against the flange 12.

The drive apparatus 100 further comprises a motor assembly 20 comprising a housing 21 secured to the forepart A1. The housing 21 has an open end, a closed end and an inner space 201 between the open end and the closed end. The housing 21 also has an annular support 203 disposed in the inner space 201 at the closed end of the housing 21. The annular support 203 defines a passage 202 in the closed end of the housing 21 through which the sleeve 10 extends.

The drive apparatus 100 further comprises a guide member 22 fastened to the housing 21 between the inner space 201 and the forepart A1. The guide member 22 has an opening 221 in communication with the inner space 201 and the cavity A12. According to an embodiment of the present invention, the guide member 22 is a thin plate member as shown in FIG. 2.

The motor assembly 20 further comprises a stator set 23 disposed in the inner space 201. The stator set 23 is positioned by abutting, or pressing against, the annular support 203. When the drive apparatus 100 is assembled, the sleeve 10 extends through the passage 202 in the closed end of the housing 21, and the rotor 11 provided on the sleeve 10 is surrounded by the stator set 23. According to an embodiment of the present invention, the rotor 11, the sleeve 10 and the extension shaft A11 are co-rotatable.

The drive apparatus 100 further comprises a first cooling fan 50 mounted on an inner end of the sleeve 10 and spaced from the rotor 11. The first cooling fan 50 is disposed between the opening 221 and the sleeve 10 and is at least partly disposed within the cavity A12. As shown in FIG. 3, the first cooling fan 50 may be partially disposed in the opening 221 and, optionally, also located in the inner space 201.

The drive apparatus 100 further comprises a wheel 40 and a second cooling fan 60 that is formed integrally with the wheel 40. The wheel 40 is arranged for manual rotation of the extension shaft A11. The sleeve 10 also has a free end opposite to the inner end such that the rotor 11 is mounted between the free end and the inner end of the sleeve 10. The wheel 40 is fastened on the free end of the sleeve 10 and is disposed outside of the housing 21.

In other embodiments of the present invention, the second cooling fan 60 and the wheel 40 may be separate parts that are assembled as a part of the drive apparatus 100.

The drive apparatus 100 further comprises an arcuate sensor 30 that is secured to the stator set 23 for sensing the relative positions of the rotor 11 and the north and south magnetic poles (N and S) of the rotor 11. As such, the installation of an additional magnet, such as ring-shaped magnet, is not required for sensing and calibrating purposes and the rotor 11 can be controlled precisely.

Figure 4:
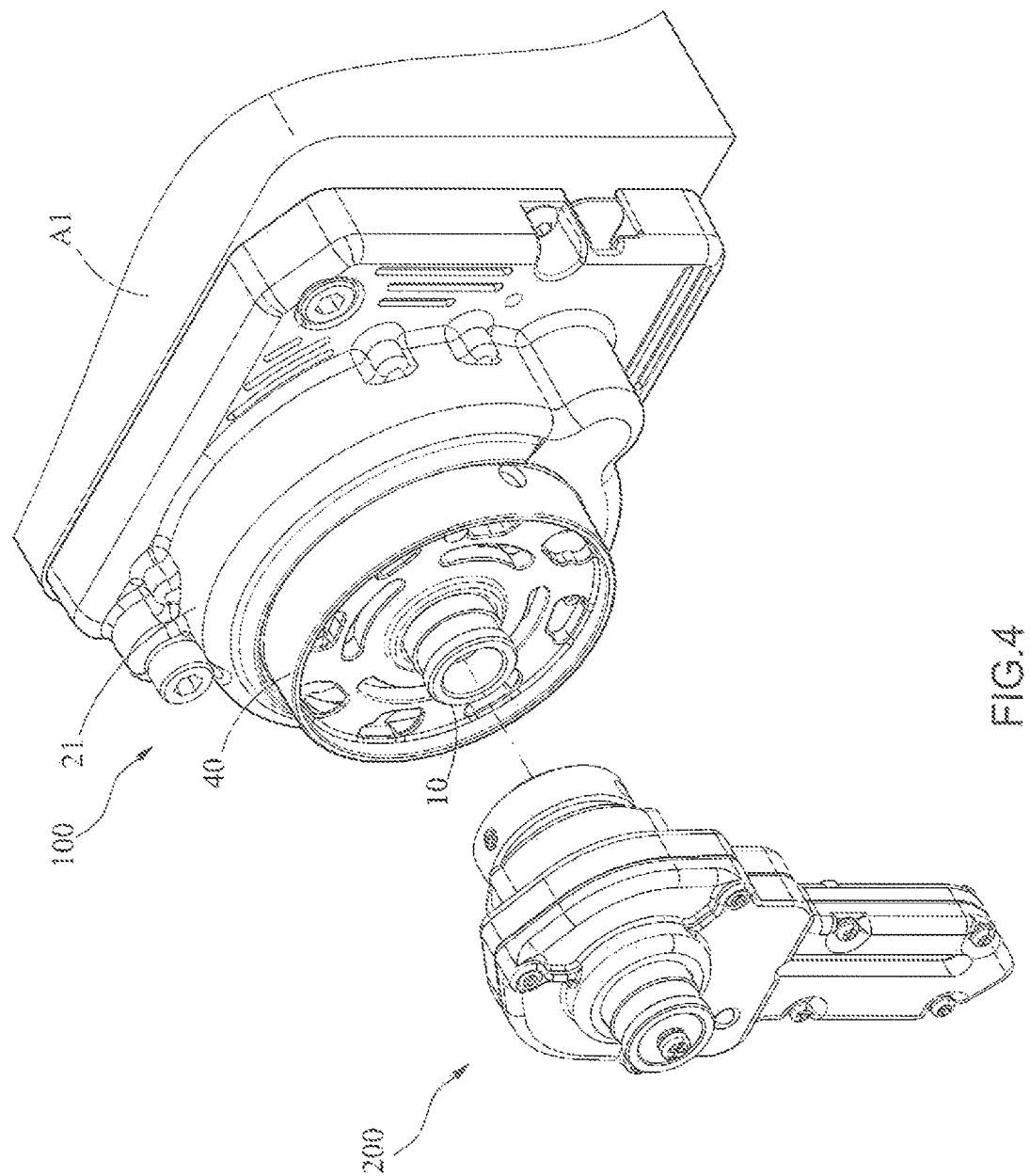
FIG. 4 is a perspective view corresponding to FIG. 1 showing the drive apparatus with an attachment member.
Figure 5:
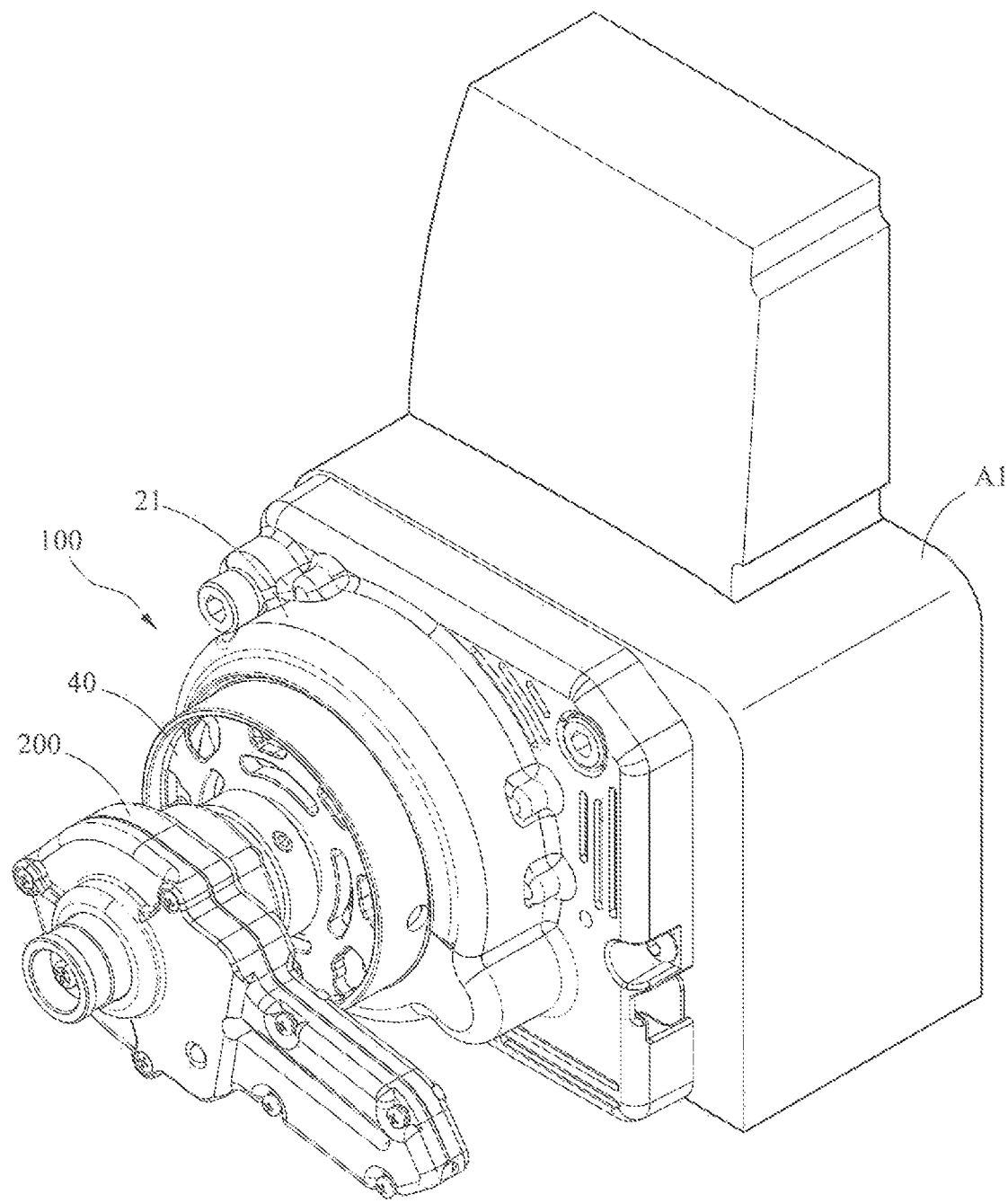
FIG. 5 is a perspective view of the assembled drive apparatus and attachment member.
Figure 6:
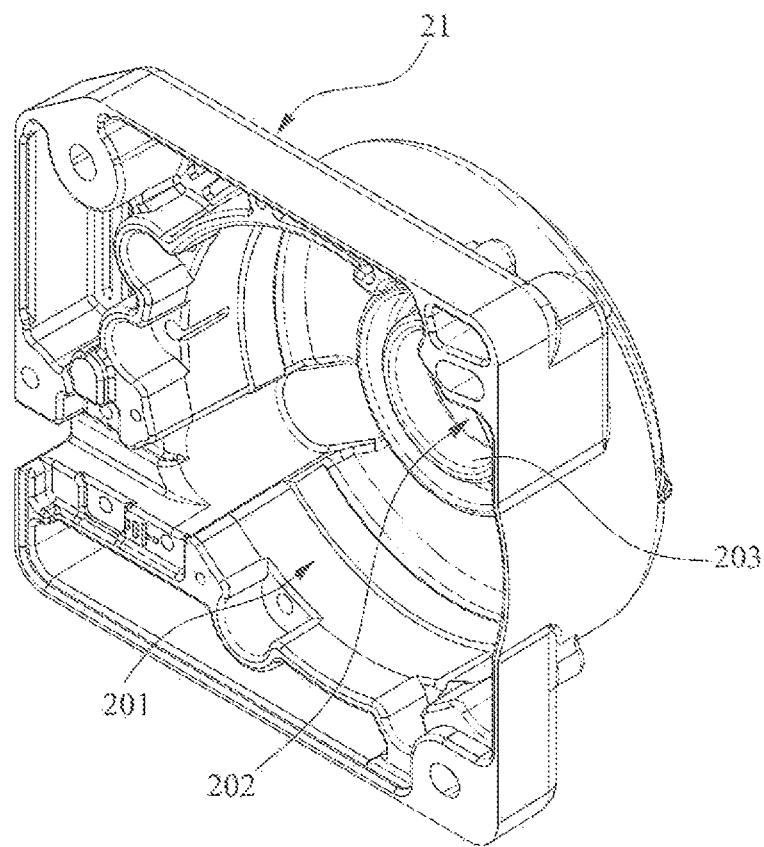
FIG. 6 is a perspective view of a motor housing of the drive apparatus of FIG. 1.
Figure 7:
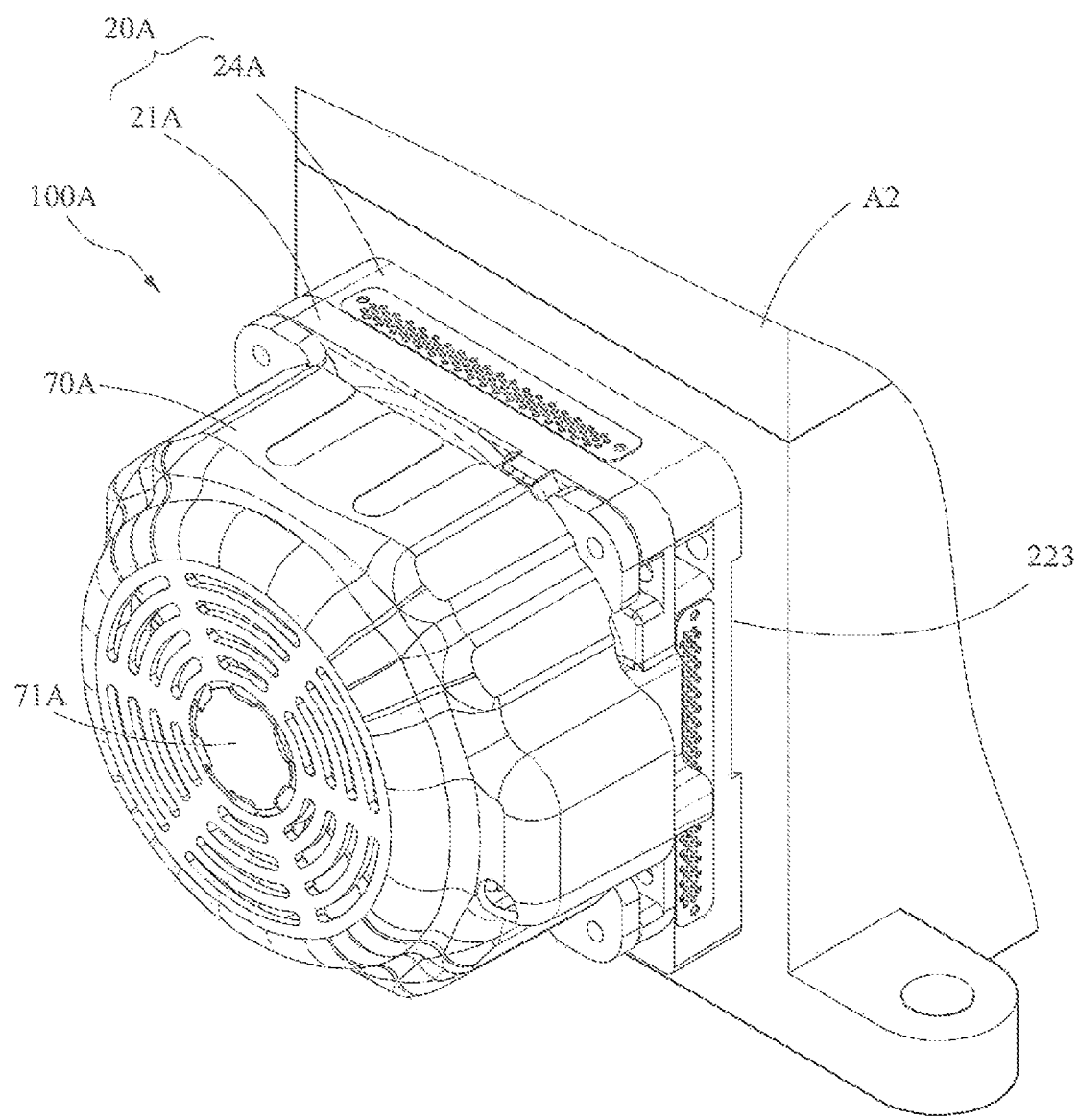
FIG. 7 is a perspective view of a drive apparatus for a sewing machine according to another embodiment of the present invention.

As shown in FIGS. 4 and 5, an attachment member 200 may be selectively secured to the sleeve 10 outwardly of the wheel 40 such that the wheel is disposed between the attachment member and the housing 21.

Figure 8:
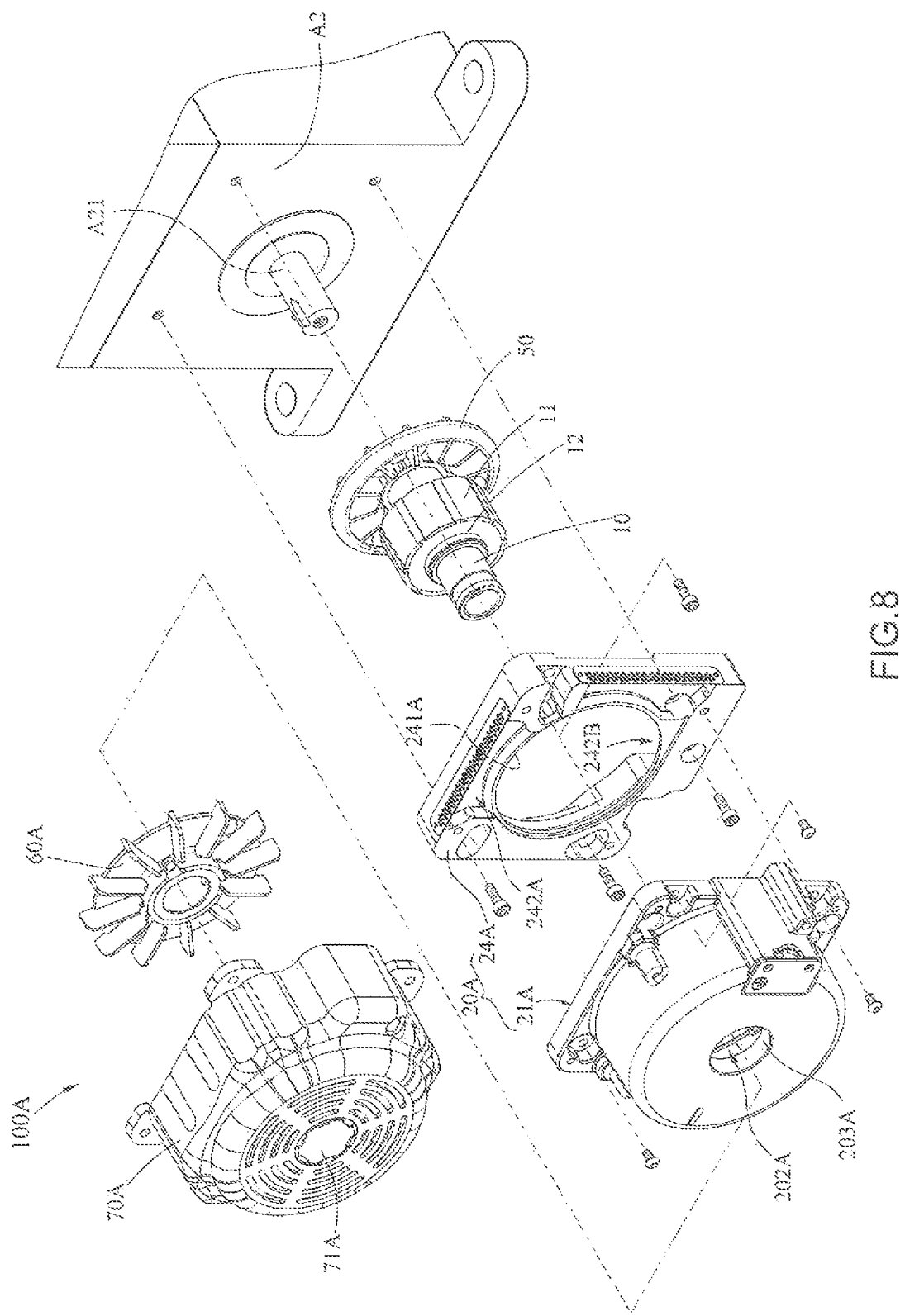
FIG. 8 is an exploded view of FIG. 7.
Figure 9:
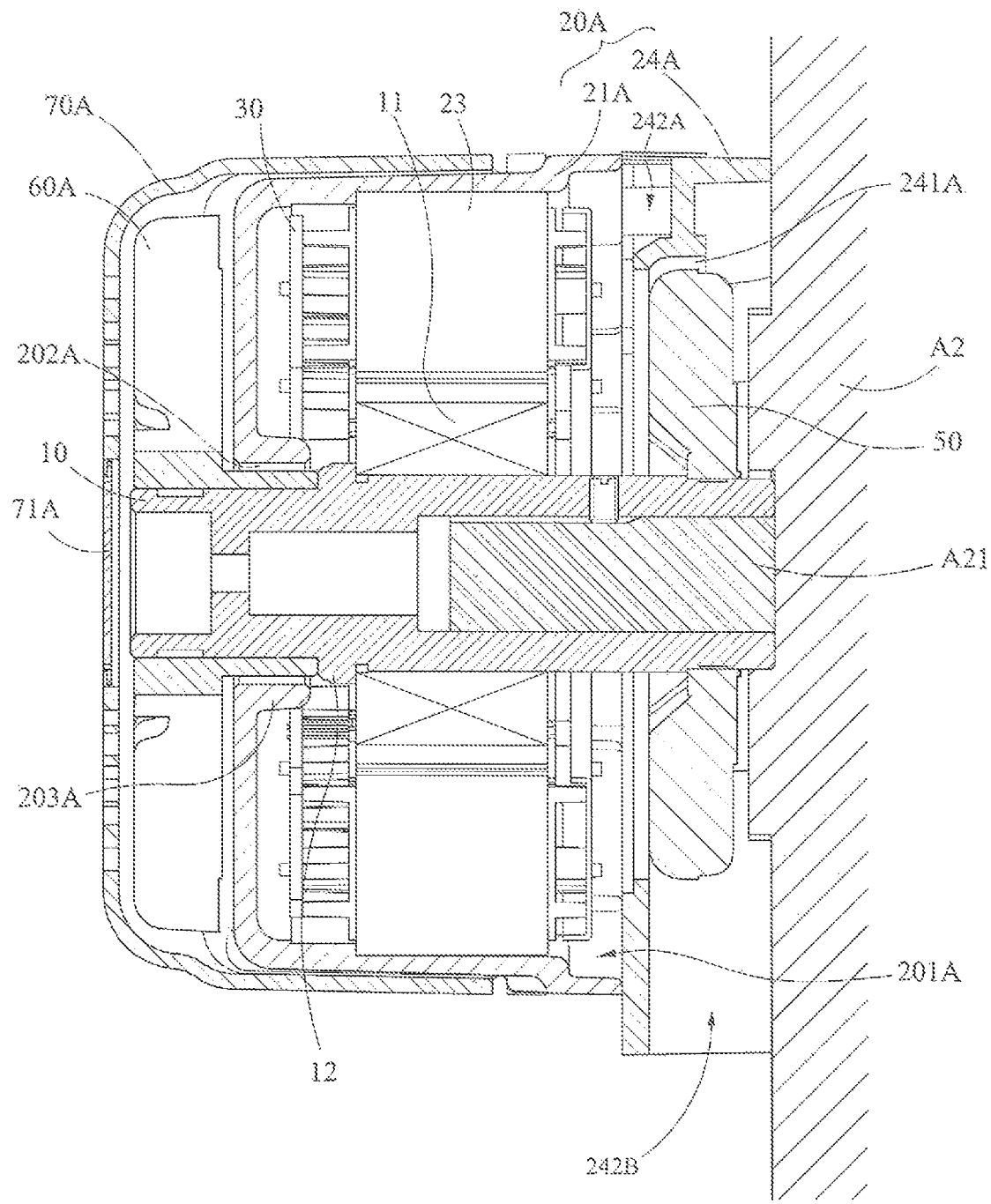
FIG. 9 is a longitudinal sectional view of the drive apparatus of FIG. 7.

Referring to FIGS. 7 to 12, a drive apparatus 100A in accordance with a second embodiment is shown mounted to a body part of a sewing machine. The body part may be forepart A2 of the sewing machine. The forepart A2 includes an extension shaft A21 projecting from a generally flat outer surface of the forepart A2 or other body part of the sewing machine. As shown in FIG. 9, the shaft A21 may be surrounded by a boss, which may be integral with the outer surface of the body part.

The main components of the second embodiment are similar to those of the first embodiment and have the same functions. Accordingly, the same reference numerals are given to the same components and repeat descriptions are omitted. As seen in FIGS. 8 and 9, the drive apparatus 100A comprises a sleeve 10, an annular flange 12 and a rotor 11. The sleeve 10 is secured to the extension shaft A21 so as to be rotatable with the extension shaft. The annular flange 12 is provided on the sleeve 10 and a rotor 11 is positioned on the sleeve by pressing, or abutting, against the flange 12.

The drive apparatus 100A further comprises a motor assembly 20A comprising a housing 21A secured to the forepart A2 along with a guide member 24A. The housing 21A has a closed end, an open end and an inner space 201A between the closed end and the open end. The housing 21A also has an annular support 203A disposed in the inner spaced 201A at the closed end of housing 21A. The annular support 203A defines a passage 202A in the closed end of the housing 21A through which the sleeve 10 extends.

As in the first embodiment, the stator set 23 of the second embodiment is also disposed in the inner space 201A. The rotor 11, sleeve 10 and extension shaft A21 are rotatable together. The sensor or a sensing assembly 30 is disposed in the inner space 201A.

The guide member 24A is located between the housing 21A and the forepart A2, and has an opening 241A connecting to the inner space 201A. The opening 241A may connect with a plurality of inlets 242A and an outlet 242B. The inlets 242A may be provided in the top or side(s) of the guide member 24A. The outlet 242B is defined by an opening at a lowermost side, or bottom, of the guide member 24A.

The first cooling fan 50 of the second embodiment is mounted on the inner end of the sleeve 10 generally adjacent the forepart A2 in the same manner as in the first embodiment. Due to the flat outer surface of the forepart A2, the first cooling fan 50 in the second embodiment is at least partially received in the opening 241A of the guide member 24A. The inlets 242A and the outlet 242B, together with the opening 241A and the first cooling fan 50, are used for cooling purposes.

Figure 10:
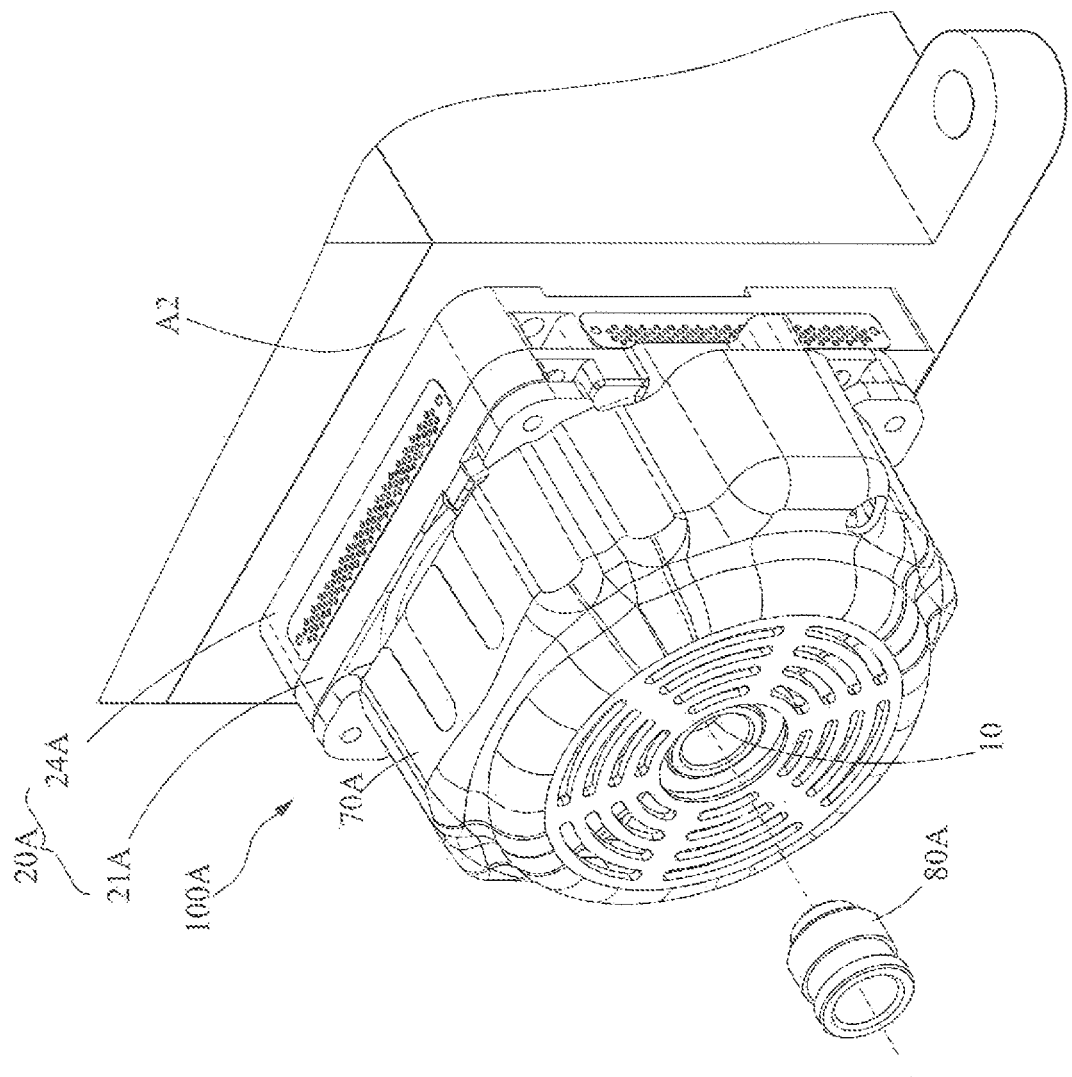
FIG. 10 is a perspective view corresponding to FIG. 7 showing the drive apparatus with an attachment member and an adapter.
Figure 10:
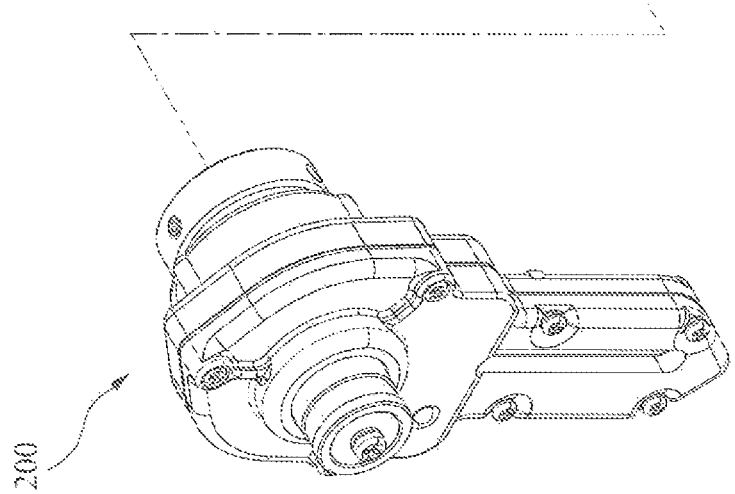
Figure 11:
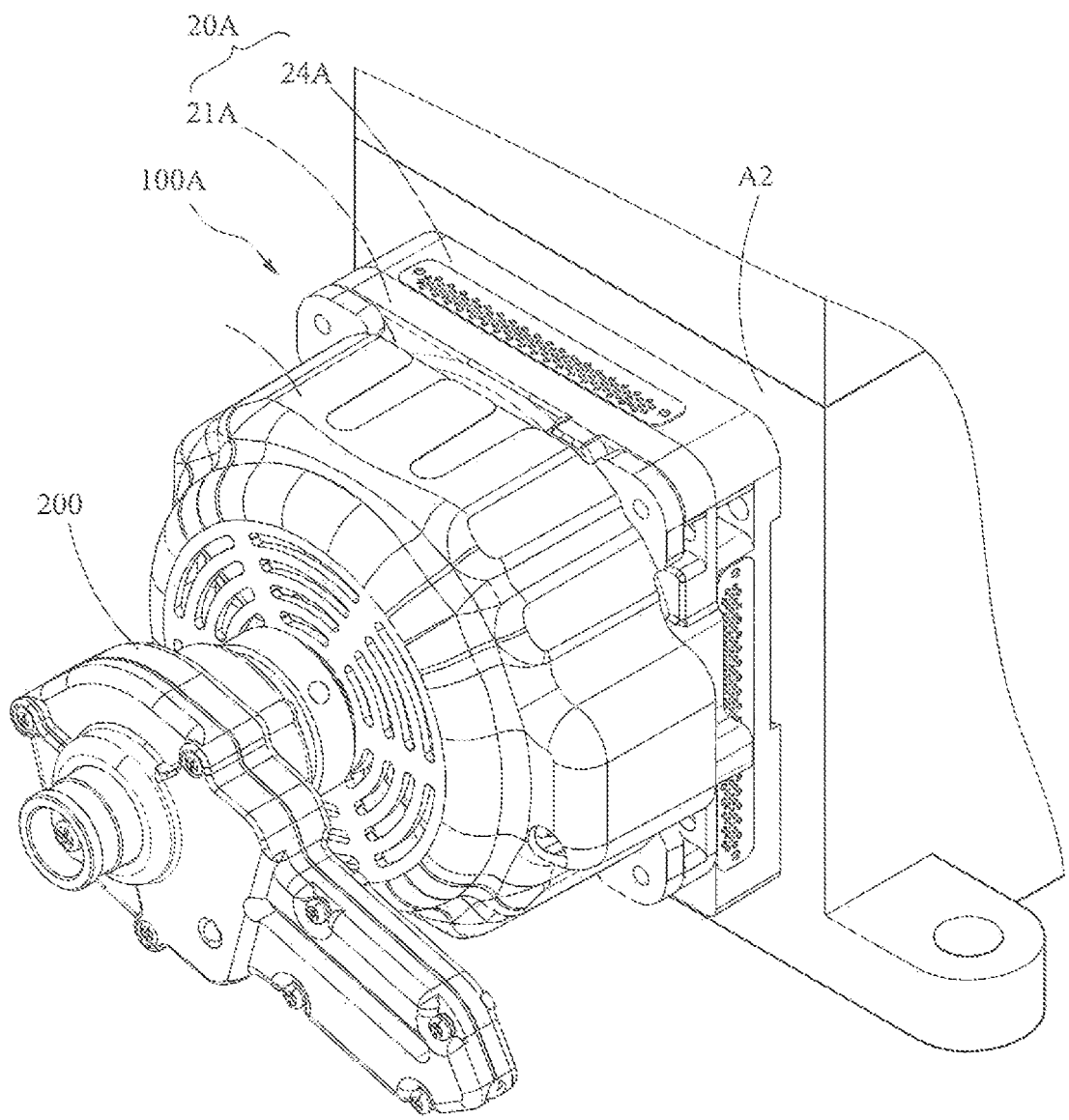
FIG. 11 is a perspective view of the assembled drive apparatus and attachment member.
Figure 12:
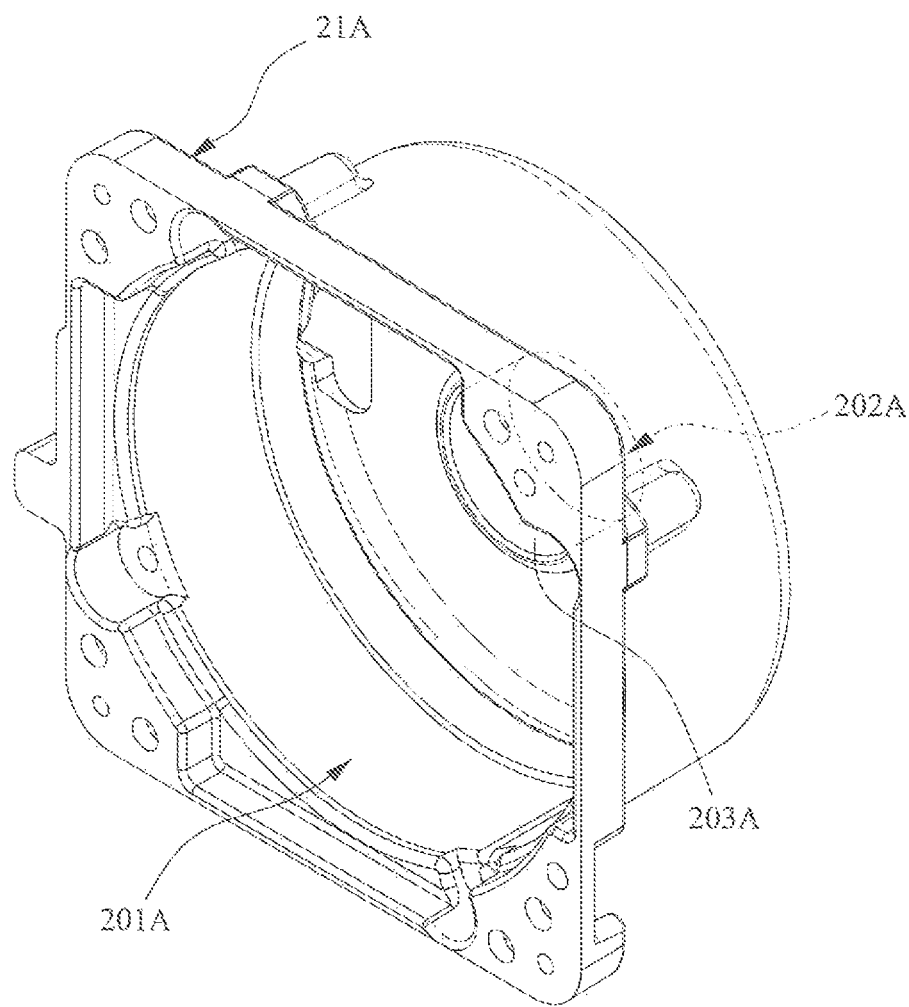
FIG. 12 is a perspective view of a motor housing of the drive apparatus of FIG. 7.

The drive apparatus 100A further comprises a second cooling fan 60A mounted on the free end of the sleeve 10 outside of the housing and is covered by a hood 70A. The second cooling fan 60A has an inner end face that abuts, or is pressed against, the flange 12 to position the fan on the sleeve 10. The hood 70A is mounted on the housing 21A and is provided with a releasable disc shaped member, or sleeve end cover 71A. The sleeve end cover 71A can be detached from the hood 70A and replaced by a cylindrical adapter 80A, which is adapted to mount, or connect, the attachment member 200 to the sleeve 10, as shown in FIGS. 10 and 11.

The drive apparatus, according to embodiments of the present invention, may have at least one of the following advantages and benefits. As the rotor is mounted on the sleeve directly without a coupler, no bearing is provided between the rotor and the stator set. The sensor is provided in the motor housing and is adapted to sense the relative positions of the north and south magnetic poles of the rotor in cooperation with the stator set. Further, the sensing results are more precise so that correct operating parameters of the motor shaft can be obtained.

Although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A drive apparatus for use in a sewing machine, comprising:
    a sleeve secured to an extension shaft of the sewing machine, the sleeve having a free end and an annular flange adjacent to the free end, the annular flange comprising a wall radially extended from the sleeve;
    a stator set;
    a rotor disposed on the sleeve and positioned against the wall of the flange; and
    a housing having an inner space and a passage through which the free end of the sleeve extends,
    wherein the stator set is disposed in the inner space of the housing for cooperation with the rotor, and wherein the rotor, the sleeve and the extension shaft are co-rotatable, the drive apparatus further comprising a first fan and a guide member fastened to the housing, the guide member having an opening in communication with the inner space of the housing, wherein the first fan is disposed between the opening of the guide member and the sleeve.

2. The drive apparatus of claim 1, further comprising an annular support disposed in the inner space of the housing and configured to position the stator set, wherein the sleeve is arranged to extend through the annular support and the passage.

3. The drive apparatus of claim 1, further comprising a sensor secured to the stator set, the sensor is configured to provide signals indicating a position of the rotor relative to the stator set.

4. The drive apparatus of claim 1, wherein the stator set is positioned to surround the rotor.

5. The drive apparatus of claim 1, wherein the guide member is a plate member.

6. The drive apparatus of claim 1, further comprising a guide member fastened to one side of the housing, and a first fan at least partially disposed in a space defined by the guide member.

7. The drive apparatus of claim 6, wherein the guide member comprises a plurality of inlets and an outlet in communication with said space, for providing a passageway for air produced by the first fan.

8. The drive apparatus of claim 1, further comprising a wheel secured to the sleeve at said free end, the wheel arranged for manual rotation of the extension shaft.

9. The drive apparatus of claim 1, further comprising a second fan connected to the sleeve for rotation.

10. The drive apparatus of claim 6, further comprising a wheel secured to the sleeve at said free end, the wheel arranged for manual rotation of the extension shaft, and a second fan secured to the wheel.

11. The drive apparatus of claim 9, further comprising a hood fastened to the housing to cover the second fan.

12. The drive apparatus of claim 11, wherein the hood includes a releasable sleeve end cover arranged to cover the free end of the sleeve.

13. The drive apparatus of claim 12, wherein the hood comprises a hood opening adjacent to the free end of the sleeve, said drive apparatus further comprising a cylindrical adapter connected to the sleeve partly through the hood opening, the cylindrical adapter arranged to mount an attachment member to the sleeve.

14. The drive apparatus of claim 3, wherein the sensor is arranged to detect rotation of magnetic poles of the rotor.

15. A method for use with a sewing machine, the sewing machine having an extension shaft, said method comprising:
    securing a sleeve secured to the extension shaft of the sewing machine, the sleeve having a free end and an annular flange adjacent to the free end, the annular flange comprising a wall radially extended from the sleeve;
    securing a rotor on the sleeve and positioned against the wall of the flange such that the rotor, the sleeve and the extension shaft are co-rotatable;
    providing a housing over the sleeve the housing having an inner space and a passage through which the free end of the sleeve extends;
    providing a stator set in the inner space of the housing for cooperation with the rotor;
    securing a sensor to the stator set for detecting a position of the rotor relative to the stator set while the extension shaft of the sewing machine is rotating;
    securing a guide member to the housing, the guide member having an opening, and providing a first fan between the opening of the guide member and the sleeve for cooling purposes.

16. The method according to claim 15, wherein the guiding member comprises a plurality of inlets and an outlet in communication with said space, for providing a passageway for air produced by the first fan.

17. The method according to claim 15, further comprising:
   securing a wheel on the free end of the sleeve, the wheel arranged for manual rotation of the extension shaft; and
   securing a second fan to the free end in relationship to the wheel for cooling purposes.

18. The method according to claim 15, wherein the stator set is positioned to surround the rotor.

* * * * *